(12) United States Patent
Kim

(10) Patent No.: US 8,021,175 B2
(45) Date of Patent: Sep. 20, 2011

(54) SIM CARD CONNECTOR

(75) Inventor: Jung-Hoon Kim, Seoul (KR)

(73) Assignee: Tyco Electronics AMP Korea Ltd., Kyungsangbuk-Do (KR)

( * ) Notice: Subject to any disclaimer, the term of this patent is extended or adjusted under 35 U.S.C. 154(b) by 0 days.

(21) Appl. No.: 12/889,940

(22) Filed: Sep. 24, 2010

(65) Prior Publication Data

US 2011/0039442 A1   Feb. 17, 2011

Related U.S. Application Data

(63) Continuation of application No. PCT/KR2009/001510, filed on Mar. 25, 2009.

(30) Foreign Application Priority Data

Mar. 26, 2008   (KR) .................. 10-2008-0028039

(51) Int. Cl.
*H01R 13/62* (2006.01)
(52) U.S. Cl. ...................... 439/159; 439/630
(58) Field of Classification Search .............. 439/159, 439/326, 630; 235/479
See application file for complete search history.

(56) References Cited

U.S. PATENT DOCUMENTS 7,367,827 B2 * 5/2008 Chen ........................... 439/159
7,540,782 B2   6/2009 Takahashi et al.

FOREIGN PATENT DOCUMENTS

JP   2006252823   9/2006
JP   200766586    3/2007

OTHER PUBLICATIONS

PCT International Search Report for co-pending application PCT/KR2009/001510, 3 pages.

* cited by examiner

*Primary Examiner* — Khiem Nguyen
(74) *Attorney, Agent, or Firm* — Barley Snyder

(57) ABSTRACT

A subscriber identification module (SIM) card connector for mounting a subscriber identification module (SIM) card to a mobile wireless terminal, with the subscriber identification module (SIM) card connector having a reduced thickness as compared to a conventional connector. The subscriber identification module (SIM) card connector includes a case and a tray. The case has a connection board and guiding grooves formed on both sides of the connection board, and the connection board electrically connected with a SIM card. The tray is designed to slidably connect with the guiding grooves of the case. The tray accommodates the SIM card thereon.

14 Claims, 4 Drawing Sheets

US 8,021,175 B2

SIM CARD CONNECTOR

CROSS-REFERENCE TO RELATED APPLICATIONS

This application is a continuation of PCT International Application No. PCT/KR2009/001510, filed Mar. 25, 2009, which claims priority under 35 U.S.C. §119 to Korean Patent Application No. 10-2008-0028039, filed Mar. 26, 2008.

FIELD OF THE INVENTION

The invention relates to a connector for mounting a subscriber identification module (SIM) card to a mobile wireless terminal, and more particularly to a SIM card connector which is thinner but stronger.

BACKGROUND

There are several use methods of a mobile wireless terminal, including a global system for mobile communication (GSM) which is a time division multiplex connection method, a time division multiplex access (TDMA) method, a code division multiplex access (CDMA) and so forth. Notably, the GSM used in Europe basically adopts a subscriber identification module (SIM) card for identification of a user of the mobile wireless terminal.

The SIM card refers to an integrated circuit (IC) built-in card including information such as the subscriber's personal data, phone number, networking relations and the like, being in the size of approximately 2 cm length by 1 cm width by 1 mm thickness. If the SIM card, as a personal data recognizing means, is inserted in a certain mobile phone, the mobile phone can be registered with the phone number and used by the corresponding user. Having such excellent portability, use convenience and security, the SIM card has been practically used in electronic commerce and so on.

FIG. 7 shows a conventional connector used to mount the SIM card to a mobile wireless terminal.

According to the embodiment shown, the conventional SIM card connector 100 includes a case 110 and a drawer-type tray 120. The case 110 includes a housing 112 enclosing a lower part of an upper board 111, and is in the form of a box opened at one side. The upper board 111 includes electric terminals are arranged on the upper board 111 and are in electric connection with the SIM card. The drawer-type tray 120 is formed of synthetic resin and separably connected with the case 110. When the SIM card is seated in the tray 120 and the tray 120 is inserted in the case 110, the SIM card can be electrically connected with the mobile terminal.

However, according to such a conventional SIM card connector 100, the whole thickness is large. A thickness of the upper board 111 of the case 110, a bottom of the housing 112, a bottom of the tray 120 all add further to the thickness of the SIM card.

Recently, as the technology advances, the mobile terminal is becoming smaller, slimmer and lighter for better portability, though maintaining the multi-functionality and high performance, which is contrary to the conventional SIM card connector design.

Furthermore, the conventional tray 12 thinly made of a soft resin is apt to be deformed by pressure from an inner wall of the case 110 during or after insertion to the case 110. For example, in case that a bottom side of the tray 12 being soft is humped by a lateral pressure, the SIM card inserted in the tray 12 may be poorly connected with the electric terminals formed on the upper board 111, thereby causing connection failure.

SUMMARY

Therefore, the invention has been made in view of the above problems, and it is an object of the invention to provide a connector for mounting a subscriber identification module (SIM) card to a mobile wireless terminal, having a reduced thickness compared to a conventional connector although still using a tray for secure mounting of the SIM card into a mobile terminal.

The subscriber identification module (SIM) card connector includes a case and a tray. The case has a connection board and guiding grooves formed on both sides of the connection board, and the connection board electrically connected with a SIM card. The tray is designed to slidably connect with the guiding grooves of the case. The tray accommodates the SIM card thereon.

BRIEF DESCRIPTION OF THE DRAWINGS

The invention will be explained in greater detail below with reference to Figures and exemplary embodiments, without the general concept of the invention being limited.

DETAILED DESCRIPTION OF THE EMBODIMENT(S)

An embodiment of the invention will now be described in detail with reference to the accompanying drawings.

A subscriber identification module (SIM) card mentioned herein commonly refers to various cards in the form of a thin plate to be applied to a mobile terminal, being equipped with an IC chip terminal for electric connection on one side. The SIM card may include not only general SIM cards, such as a USIM card, but also other derivative cards.

Figure 1:
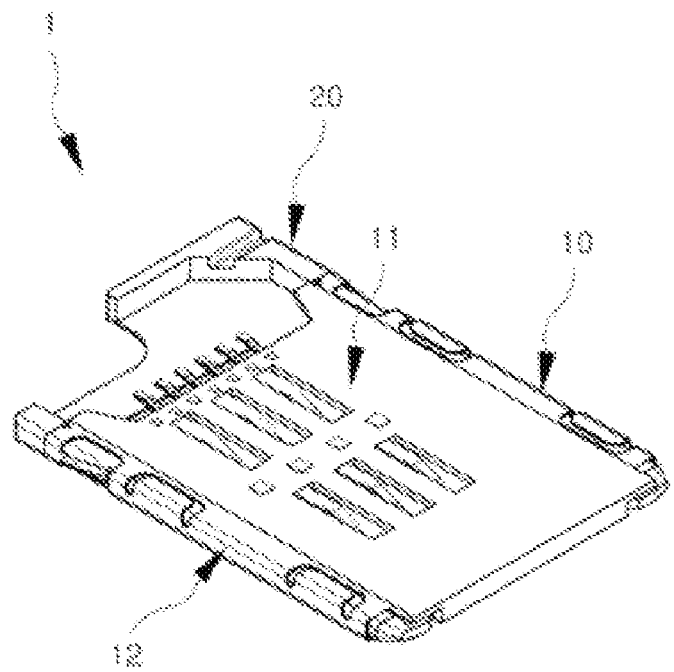
FIG. 1 is a perspective view of a connector for a subscriber identification module (SIM) card according to the invention.

FIG. 1 is a perspective view of a connector for a SIM card, according to an embodiment of the invention.

With reference to FIG. 1, a SIM card connector 1 according to the invention is shown having a case 10 mounted to a mobile terminal, and a tray 20 connected with the case 10 as seating a SIM card thereon. The case 10 includes a connection board 11 having a board form, and a guiding groove 12 formed on both sides of the connection board 11 to be connected with the tray 20 in a sliding manner.

Figure 2:
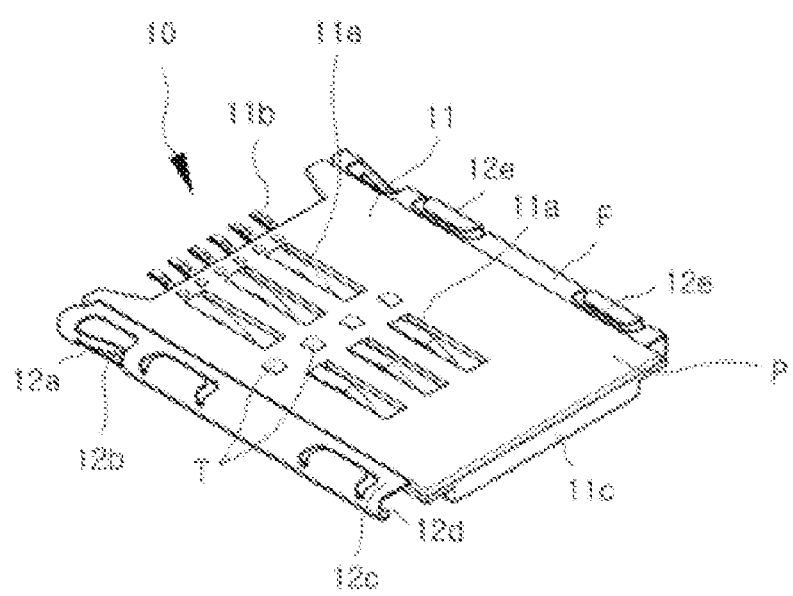
FIG. 2 is a perspective view of a case of the SIM card connector shown in FIG. 1, as seen from above.
Figure 3:
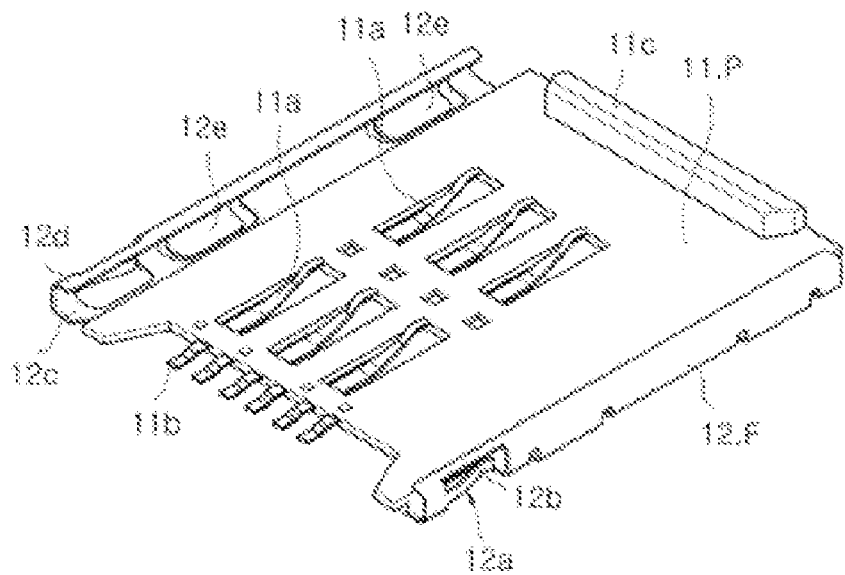
FIG. 3 is a perspective view of the case of FIG. 2, as seen from below.

With reference to FIGS. 2 and 3, on the central part of the connection board 11, a plurality of contacts 11a are recessively formed to connect to terminals of the SIM card. In addition, leads 11b corresponding to the respective contacts 11a are extended at an insertion entrance of the SIM card. The leads 11b are positioned to connect with electric wires (not shown) formed on a circuit board of the mobile terminal.

A guiding groove 12 is formed on both sides of the connection board 11 along the length, having a flattened U-shape sectional portion to enclose lateral sides of the tray 20, so that the lateral sides of the tray 20 slide along the guiding grooves 12.

According to the invention, the SIM card connector 1 is designed to protect a SIM card subjected to structural load within the tray 20. Since the case 10 includes the connection board 11 that electrically connects with the SIM card and guiding grooves 12 formed on both sides, the thickness of the SIM card connector 1 can be reduced.

The case 10 including the contacts 11a formed on a connection surface may be structured in the following manner to improve strength of the guiding grooves 12, that is, where the tray 20 is operated.

According to the invention, the case 10 includes the contacts 11a, the guiding grooves 12 and a supporting piece 12e, which will be explained later, and is formed by bending a metal frame F in the form of a thinly pressed board. The connection board 11 is formed in the center of the metal frame F, and is coated with synthetic resin P.

Figure 4:
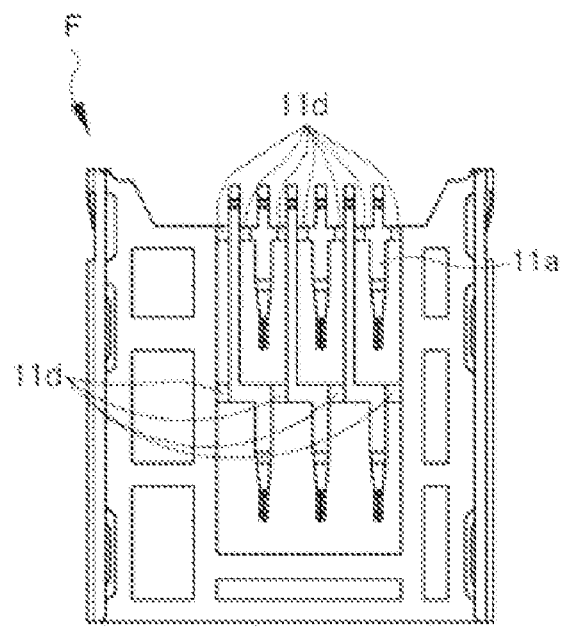
FIG. 4 is a plan view of a metal frame applied to the case shown in FIG. 2.

More specifically, the case 10 is designed and manufactured as follows. Referring to FIG. 4, part of the metal frame F having conductivity is punctured (T), thereby producing the contacts 11a. The contacts 11a as part of the metal frame F are interconnected with one another by runners. A connection layer, which is a thin resin layer, is formed in the center of the metal frame F by insert-injection molding the synthetic resin P. After that, the contacts 11a are insulated from one another by puncturing (T) the runners. Both sides of the metal frame F are bent, thereby forming the guiding grooves 12 along the length of the case 10.

By using the metal frame F, strength of the case 10 can be increased as a whole. Especially, since the guiding grooves 12 are subject to frictional abrasion by the tray 20 being frequently drawn in and out, solidity of the case 10 can be improved by increase in strength of the guiding grooves 12.

Furthermore, the contacts 11a are integrally formed from the metal frame F without having to insert and fix separate contacts. As a result, manufacturing of the case 10 is simplified. In addition, the case 10 can be formed more thinly by saving a space for mounting the contacts 11a.

Figure 5:
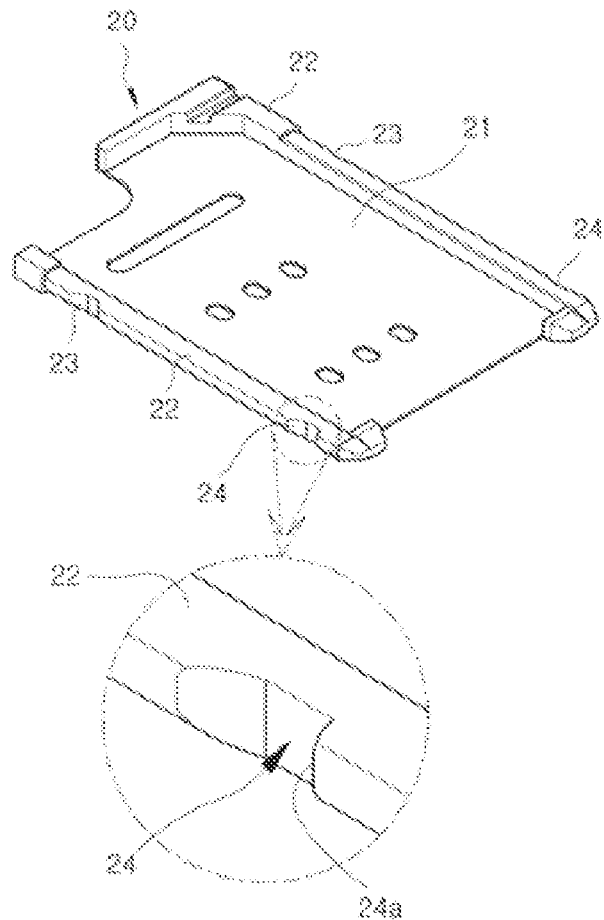
FIG. 5 is a perspective view of a tray of the SIM card connector shown in FIG. 1.
Figure 6:
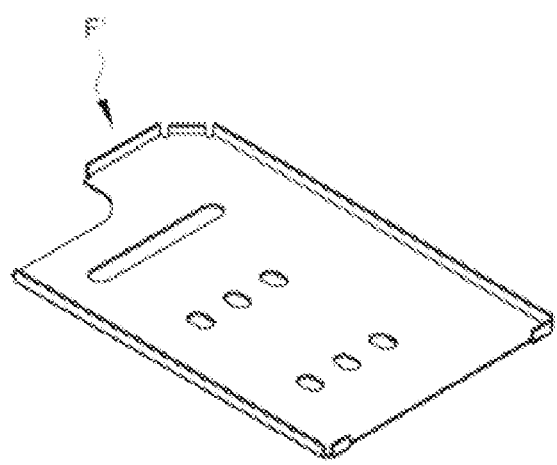
FIG. 6 is a perspective view of a metal plate formed into the tray of FIG. 5.
Figure 7:
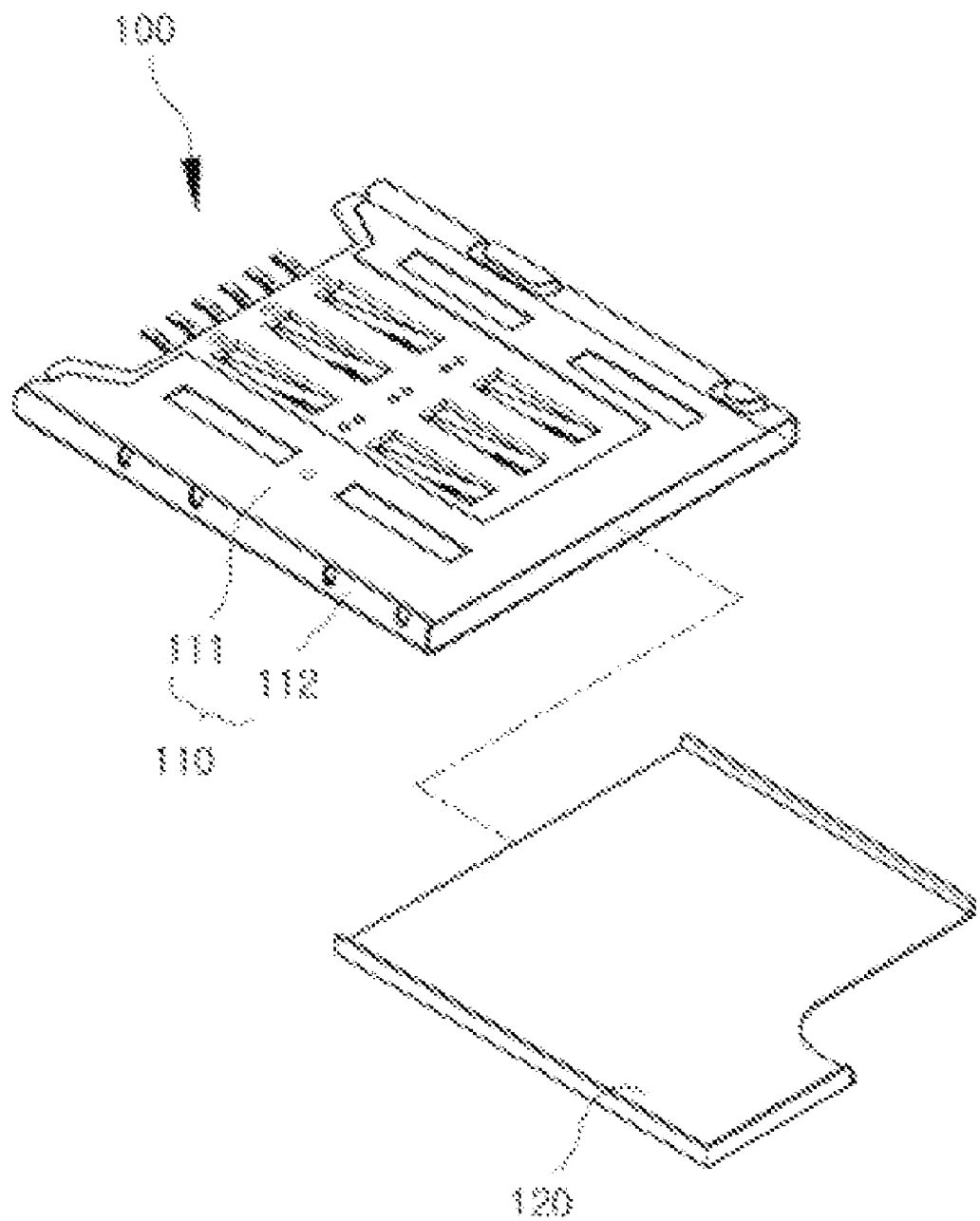
FIG. 7 is an exploded perspective view of a conventional SIM card connector.

With reference to FIGS. 5 and 6, the tray 20 of the SIM card connector 1 according to the invention is shown. The tray 20 slidingly connects with the guiding grooves 12 and includes a bottom surface 21 on which the SIM card is seated, and a sidewall 22 bent upward from edges of the bottom surface 21 to surround lateral sides of the SIM card. The tray 20 connects with the guiding grooves 12 in a sliding manner.

Since the tray 20 is subject to deformation by a force, the tray 20 is prepared from a metal material to prevent such deformation. The bottom surface 21 of the tray 20, which seats the SIM card thereon, can be more resistant to an external force although being formed thinner than a conventional soft resin tray. The sidewall 22 of the tray 20 is formed by bending edges of the bottom surface 21 that are made of the metal plate F' and molding a synthetic resin along the bent portion.

In this case, the tray 20 can be drawn in and out of the case 10 more smoothly because the sidewall 22 of the tray 20 made of synthetic resin generates lower friction than metal.

In addition, various desired forms of the synthetic resin can be shaped when insert-molded in the sidewall 22. Therefore, a depression 23 and a lock 24, which will be described hereinafter, can easily be implemented.

A stopper 11c is formed on an inner surface of the connection board 11, to restrict an inserted length of the tray 20 (see FIGS. 2 and 3). More particularly, when the tray 20 is inserted by a predetermined length, the stopper 11c prevents further insertion of the tray 20 by contact with an end of a pushing piece 12a formed in a length direction of the tray 20, such that the terminals of the SIM card (seated on the tray 20) are positioned under the contacts 11a, which are formed on the inner surface of the connection board 11. Accordingly, the SIM card and the connection board 11 can be electrically connected to each other at the correct position.

The pushing piece 12a is formed as bent inward near an entrance of the guiding groove 12 (see FIGS. 2 and 3). The depression 23 for engagement with the pushing piece 12a, is formed at longitudinal sides of the sidewall 22 of the tray 20 so as to hold the tray 20 inserted in the case 10 (see FIG. 5).

The pushing piece 12a is formed by cutting a sidewall of the guiding groove 12 into a laid flattened-U shape so that an end 12b of the pushing piece 12a is directed to the tray 20 being inserted. The pushing piece 12a is bent inwardly from the guiding groove 12 while the end 12b is bent outward. Therefore, the pushing piece 12a is elastically bias inward of the guiding groove 12, thereby elastically and tightly supporting outer walls of the tray 20 moving in the guiding groove 12.

In addition, since the depression 23 is formed inwardly on lateral sides of the tray 20 at a position corresponding to the stopper 11c, when the tray 20 is fully inserted up to the stopper 11c and the SIM card is completely connected with the contacts 11a, the pushing piece 12a is fitted in the depression 23 by a recovery force thereof.

Accordingly, once the tray 20 is completely inserted, vibration or impacts do not separate the tray 20 from the case 10 until the user draws the tray 20 out. Therefore, the connection between the SIM card and the contacts 11a is maintained.

Furthermore, when the pushing piece 12a contacts the depression 23, the contact is directly transmitted to the user such that the user can confirm that the tray 20 is inserted in the case 10 to the proper position.

Additionally, the lock 24 is formed on the longitudinal sides of the sidewall 22 of the tray 20 to prevent separation of the drawn-out tray 20 from the case 10 by interfering with the end 12b of the pushing piece 12a. More specifically, when the tray 20 is drawn out from the case 10 to remove the SIM card, the lock 24 interferes with the end 12b of the pushing piece 12a so that the tray 20 is not fully separated out from the case 10. Moreover, when the end 12b of the pushing piece 12a is locked in the lock 24, the user can appreciate the locking feel and prevent breakage of the tray 20 by excessively pushing the tray 20. For this reason, the lock 24 is positioned at an end of each longitudinal side of the sidewall 22 of the tray 20, and includes a supporting surface 24a depressed perpendicularly to the length of the tray 20.

A supporting piece 12e for soldering projects outward from an upper surface 12c or a lower surface 12d of the guiding groove 12, so as to be easily mounted to the circuit board of the mobile terminal. More particularly, the supporting piece 12e projects upward more than the upper surface 12c or downward more than the lower surface 12d of the guiding groove 12.

According to the embodiment shown, the supporting piece 12e may be formed by partly cutting the guiding groove 12 made of the metal frame F and protruded upward by the thickness of the synthetic resin P formed at the connection surface, such that the case 10 can be brought into surface-contact with the circuit board which is flat.

In this case, since the supporting piece 12e formed of metal is not deformed by heat during soldering, the case 10 can be fixed to the circuit board using the conventional soldering mounting.

As described the above, the SIM card connector 1 according to the invention is a thinly formed tray 20 for seating a SIM card, and is designed to prevent deformation of the SIM card. The case 10, which connects with the tray 20, includes a connection surface and guiding grooves 12, which are formed on both sides of the connection surface. Therefore, a housing used in the conventional SIM card connector is omitted, and as a result the overall thickness of the SIM card connector 1 is reduced. Consequently, the mobile terminal can be formed more compactly, thereby improving competitiveness thereof.

More specifically, since the guiding grooves 12 are the thickest part of the SIM card connector 1, the thickness of the SIM card connector 1 according to the invention can be minimized as compared to the conventional SIM card connector. That is, the SIM card connector 1 according to the invention can be reduced in thickness compared to the conventional SIM card connector made of only synthetic resin.

In addition, if the case 10 is formed by injection-molding synthetic resin onto a metal frame, the SIM card connector 1 can be formed thinner as compared to the conventional SIM card connector, without compromising strength.

The guiding groove 12 of the case 10, where the tray 20 is received, is made of metal having high strength. Therefore, the guiding groove 12 can be less susceptible to deformation by operation of the tray 20, and thus improved in durability.

Furthermore, the tray 20 made of metal is not only thinner than the conventional tray, but also resistant to deformation from external forces.

It is a further object of the invention to restrict an operational range of the tray 20 so that the SIM card, seated on the tray 20 and inserted in the case 10, can securely achieve electric connection at a correct position, and to more conveniently connect and separate the SIM card by sensing the in and out movement of the tray 20.

According to the invention, synthetic resin is molded on a wall of the tray 20. Therefore, friction between the wall and the tray 20 being drawn in and out of the case 10 along the guiding grooves 12 can be diminished, thereby smoothing the operation.

The stopper 11c interrupts insertion of the tray 20 at the position where the SIM card seated on the tray 20 is correctly connected with contacts 11a, so that electric connection between the SIM card and the mobile terminal is secured.

When a pushing piece 12a and a depression 23 are provided, the pushing piece 12a is fitted with the depression 23 when the tray 20 is inserted in the case 10. Therefore, the tray 20 is not separated without a user's dedicated withdrawing operation, thus securing electric connection between the SIM card and the contacts 11a.

Furthermore, when inserting the tray 20, the user can determine whether the tray 20 is inserted by a proper depth through a connection feel between the pushing piece 12a and the depression 23. Accordingly, the user can more easily perform connection and separation of the SIM card.

Meanwhile, in a case 10 where the pushing piece 12a and a lock 24 are provided, the lock 24 is interrupted by an end 12b of the pushing piece 12a so that separation of the tray 20 from the case 10 can be prevented when the tray 20 is drawn out to remove the SIM card.

Also, since a supporting piece 12e for soldering protrudes outward at an upper or lower part of the guiding groove 12, the supporting piece 12e can be conveniently fixed to a circuit board of the mobile terminal by soldering.

The configurations described in the above-described embodiment can be selected or changed to other configurations as appropriate. Those skilled in the art will appreciate that various modifications, additions and substitutions are possible, without departing from the scope and spirit of the invention as disclosed in the accompanying claims.

What is claimed is:

1. A subscriber identification module (SIM) card connector comprising:
   a case having a connection board and guiding grooves formed on both sides of the connection board, the connection board being electrically connectable with a SIM card; and
   a tray slidably connected with the guiding grooves, the tray, receiving the SIM card thereon;
   wherein the guiding grooves are formed by bending both edges of a metal frame and the connection board is formed by coating the metal frame with synthetic resin.

2. The SIM card connector according to claim 1, further comprising a contact formed on the connection board.

3. The SIM card connector according to claim 1, wherein the tray includes a bottom surface to seat the SIM card thereon and a sidewall.

4. The SIM card connector according to claim 3, wherein the sidewall is formed by bending edges of the bottom surface.

5. The SIM card connector according to claim 1, wherein the sidewall connects with the guiding grooves in a sliding manner.

6. The SIM card connector according to claim 3, wherein a synthetic resin is applied to the sidewall.

7. The SIM card connector according to claim 1, further comprising a stopper positioned on an inner surface of the connection board to restrict the tray.

8. The SIM card connector according to claim 6, further comprising a stopper positioned on an inner surface of the connection board to restrict the tray.

9. The SIM card connector according to claim 1, further comprising a pushing piece formed inwardly at a SIM card insertion entrance of the guiding groove.

10. The SIM card connector according to claim 9, further comprising a depression formed on longitudinal sides of the sidewall of the tray to fit with the pushing piece and fix the tray inserted in the case.

11. The SIM card connector according to claim 10, further comprising a lock positioned on the longitudinal side of the sidewall.

12. The SIM card connector according to claim 11, wherein the lock interferes with an end of the pushing piece so that the tray is not fully separated from the case when drawn out.

13. The SIM card connector according to claim 1, further comprising a supporting piece for soldering to a circuit board.

14. The SIM card connector according to claim 13, wherein the supporting piece protrudes outward from an upper surface or a lower surface of the guiding groove.

* * * * *